(12) United States Patent
Sozer et al.

(10) Patent No.: US 9,608,554 B2
(45) Date of Patent: Mar. 28, 2017

(54) D-Q CONTROL SYSTEM AND METHOD FOR CONTROLLING A SWITCHED RELUCTANCE MOTOR

(71) Applicants: Yilmaz Sozer, Stow, OH (US); Tausif Husain, Akron, OH (US); Ali Elrayyah, Akron, OH (US)

(72) Inventors: Yilmaz Sozer, Stow, OH (US); Tausif Husain, Akron, OH (US); Ali Elrayyah, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/596,462

(22) Filed: Jan. 14, 2015

(65) Prior Publication Data

US 2015/0200617 A1 Jul. 16, 2015

Related U.S. Application Data

(60) Provisional application No. 61/927,253, filed on Jan. 14, 2014.

(51) Int. Cl.
*H02P 25/08* (2016.01)
*H02P 21/00* (2016.01)
(Continued)

(52) U.S. Cl.
CPC .............. *H02P 25/08* (2013.01); *H02P 21/00* (2013.01); *H02K 19/103* (2013.01); *H02P 6/182* (2013.01); *H02P 25/082* (2013.01)

(58) Field of Classification Search
CPC ..... H02K 19/103; H02P 25/08; H02P 25/082; H02P 6/182; H02P 6/002
(Continued)

(56) References Cited

U.S. PATENT DOCUMENTS

2010/0315030 A1* 12/2010 Koenig ................... H02P 25/08
318/400.15
2012/0104986 A1* 5/2012 Ahn ...................... H02P 23/0086
318/701
(Continued)

OTHER PUBLICATIONS

Nicholas J. Nagel et al., "Rotating Vector Methods for Smooth Torque Control of a Switched Reluctance Motor Device", IEEE Transactions on Industry Applications, vol. 36, No. 2, Mar./Apr. 2000, pp. 540-549.
(Continued)

*Primary Examiner* — Kawing Chan
*Assistant Examiner* — Bradley Brown
(74) *Attorney, Agent, or Firm* — Renner, Kenner, Greive, Bobak, Taylor and Weber

(57) ABSTRACT

A D-Q or rotating reference frame control system for a switched reluctance motor (SRM) provides a negativity removal module and a non-linear model module. As such, the control system utilizes control inputs $f_q$ and $f_d$, which are converted into the ABC domain as electrical current functions $f'_{ix}$ with negative values. The negativity removal module is configured to share the torque portion of the negative values of the electrical current functions $f'_{ix}$ for each of the three phases of the SRM motor to remove the negative values. The non-linear module corrects the non-linearity of the SRM to smooth the torque that is output. The control system also utilizes a phase advancing module, which outputs $f_d$ for achieving a wide range of operating speeds.

4 Claims, 4 Drawing Sheets

(51) Int. Cl.
*H02P 6/182* (2016.01)
*H02K 19/10* (2006.01)

(58) Field of Classification Search
USPC .............................................. 318/254.1, 701
See application file for complete search history.

(56) References Cited

U.S. PATENT DOCUMENTS

| | | | | |
|---|---|---|---|---|
| 2013/0287602 | A1* | 10/2013 | Suzuki | F04B 17/03 417/410.1 |
| 2014/0217944 | A1* | 8/2014 | Yang | H02P 6/18 318/400.34 |
| 2014/0253002 | A1* | 9/2014 | Mikail | H02P 6/10 318/400.15 |

OTHER PUBLICATIONS

X. D. Xue et al., "Optimization and Evaluation of Torque-Sharing Functions for Torque Ripple Minimization in Switched Reluctance Motor Drives", IEEE Transactions on Power Electronics, vol. 24, No. 9, Sep. 2009, pp. 2076-2090.

H. Moradi Cheshmehbeigi et al., "Self-Tuning Approach to Optimization of Excitation Angles for Switched-Reluctance Motor Drives Using Fuzzy Adaptive Controller", Power Electron. and Appl., 2009. EPE '09, 2009, pp. 1-10.

Thomas M. Jahns, "Motion Control with Permanent-Magnet AC Machines", Proceedings of the IEEE, vol. 82, No. 8, Aug. 1994, pp. 1241-1252.

K. R. Geldhof et al., "A Space Vector Strategy for Smooth Torque Control of Switched Reluctance Machines" in Proc. IEMDC '07, 2007, pp. 1269-1275.

D. S. Schramm et al., "Torque Ripple Reduction of Switched Reluctance Motors by Phase Current Optimal Profiling", Proc. IEEE PESC '92, 1992, pp. 857-860.

* cited by examiner

D-Q CONTROL SYSTEM AND METHOD FOR CONTROLLING A SWITCHED RELUCTANCE MOTOR

CROSS-REFERENCE TO RELATED APPLICATION

This application claims the benefit of U.S. Provisional Application No. 61/927,253 filed on Jan. 14, 2014, the content of which is incorporated herein by reference.

TECHNICAL FIELD

Generally, the present invention relates to switched reluctance motors (SRM). Particularly, the present invention relates to control systems for SRMs. More particularly, the present invention relates to a control system that controls an SRM using a D-Q rotating reference frame.

BACKGROUND OF THE INVENTION

Switched reluctance motors (SRM) provide a low-cost, reliable, high-torque alternative to rare earth-based permanent magnet motors. These qualities of SRMs make them desirable for many industrial, traction and household applications. However, many factors limit the use of SRMs, including their control complexity, torque ripple, acoustic noise, and the need for the SRM to adapt to operating parameter variations.

D-Q or rotating reference frame control systems have been used for controlling the operation of synchronous motors (SM), but have not been used to control switched reluctance motors (SRM). This is because the phases of the SRM are uncoupled, and the electrical currents used by the SRM are unidirectional. However, it would be desirable to utilize a D-Q control system with a switched reluctance motor (SRM) to provide a low-cost motor that has a wide torque range, and that has reduced torque ripple.

Therefore, there is a need for a system and method for controlling a switched reluctance motor (SRM) using a D-Q rotating reference frame control system by representing the electromagnetic torque as the product of sinusoidal inductance (related term) and sinusoidal current (dependent term). In addition, there is a need for a system and method for controlling an SRM using a D-Q rotating reference frame control system that is configured to readily be retrofit with an existing control system that is used to control rare-earth permanent magnet synchronous motors (SM), so as to facilitate the efforts of control engineers to easily adapt their existing SM control systems for use with switch reluctance motors (SRM).

SUMMARY OF THE INVENTION

In light of the foregoing, it is a first aspect of the present invention to provide a D-Q or rotating reference frame control system for a switched reluctance motor (SRM).

It is a further aspect of the present invention to provide a converter module for a D-Q control system for controlling a switched reluctance motor (SRM) by a torque command signal having a plurality of signal components, each signal component associated with a respective phase of the SRM in a D-Q domain, whereby a D-Q to ABC converter module converts the torque command signal in the D-Q domain into a sinusoidal torque command signal in an ABC domain where the signal components together express the torque command as a distorted sinusoid, such that at least one of the signal components has a negative value, the converter module comprising a negativity removal module adapted to be coupled to the output of the D-Q to ABC converter to distribute a torque portion of the signal component having the at least one negative value between the other signal components, such that the negativity removal module outputs the torque command signal with signal components having positive values; and a non-linear module adapted to be coupled to the input of the SRM, the non-linear module coupled to the output of the negativity removal module, such that the non-linear module modifies the signal components to remove the distortion from the sinusoid, wherein the modified signal components output by the non-linear module are applied to the SRM to control the torque output therefrom.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
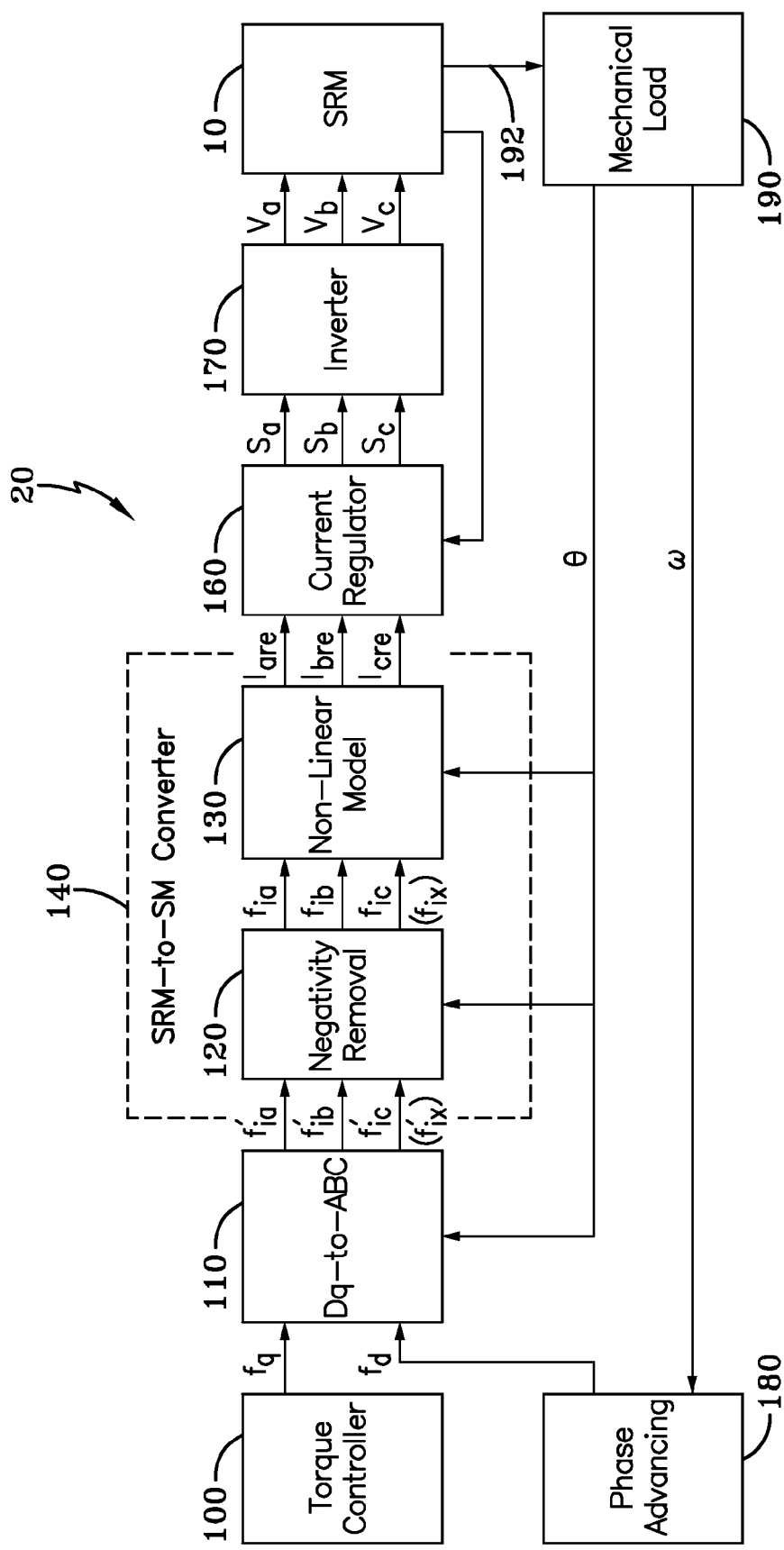
FIG. 1 is a block diagram of a D-Q control system for a switched reluctance motor (SRM) in accordance with the concepts of the present invention.

A D-Q or rotating reference frame control system for controlling a switched reluctance motor (SRM) 10 is generally referred to by numeral 20, as shown in FIG. 1 of the drawings.

The D-Q control system 20 includes a torque controller 100 that is coupled to a D-Q-to-ABC converter 110. It should be appreciated that for the purposes of the following discussion, the term "D-Q" refers to a rotating reference frame, and as such the D-Q controller 20 is a controller that utilizes a rotating reference frame to carry out the various functions to be discussed. The D-Q-to-ABC converter 110 operates to convert or transform the torque (T) related signal ($f_q$) in the rotating D-Q reference frame (i.e. d-q axes) into a stationary reference frame or phase coordinate system (A,B,C) (i.e. inverse park transformation). As such, the D-Q-to-ABC converter 110 transforms the DC (direct current) quantities of D and Q (i.e. D-Q domain) into three-phase AC (alternating current) quantities A, B, and C (i.e. ABC domain).

Continuing, the output of the D-Q-to-ABC converter 110 is coupled to a negativity removal module 120. In addition, the output of the negativity removal module 120 is coupled to a non-linear model module 130. It should be appreciated that the negativity removal module 120 and the non-linear module 130 together form an SRM (switched reluctance motor) to SM (synchronous motor) converter 140. Coupled to the output of the non-linear model module 130 is a current regulator module 160. The output of the current regulator module 160 is coupled to an inverter module 170. The output of the inverter module 170 is coupled to the switched reluctance motor (SRM) 10. As such, the current regulator module 160 and the inverter module 170 together serve to provide the power in the necessary electrical formal to drive the SRM 10. In addition, the SRM 10 may comprise a three-phase SRM, which is coupled to a mechanical load 190 via a retaining shaft/rotor or other mechanical transmission means 192. In addition, a phase-advancing module 180 is coupled to the D-Q-to-ABC converter module 110 and a mechanical load 190. In addition, the current regulator 160 and the SRM 10 are coupled directly together. Furthermore, the mechanical load 190 is also coupled to the D-Q-to-ABC converter 110, the negativity removal module 120, and the non-linear module 130 to provide the angular rotor position ($\theta$) information associated with the mechanical load/SRM thereto. In addition, the mechanical load 190 is coupled to the phase-advancing module 180 to provide speed ($\omega$) information associated with the mechanical load/SRM thereto.

It should be appreciated that in standard field-oriented control systems used to control a synchronous motor (SM), the output of the D-Q to ABC converter 110 is directly connected to the current regulator module 160. In other words, a standard control system for a SM motor comprises the control system 10, as shown in FIG. 1, without the inclusion of the SRM-to-SM converter 140. However, due to the particular operation of the SRM 10, the standard SM control system can be readily modified through the addition of the SRM-to-SM converter 140 to control an SRM motor 10, as shown in FIG. 1. That is, the SRM-To-SM converter 140, when added or retrofit to the SM control system allows the control system, which would only be compatible with the operation of an SM motor, to be compatible with the operation of an SRM motor 10. Such feature is highly desirable, as existing SM control systems can be readily modified and retrofit to control SRM motors 10, with minimal cost and expense.

As such, the D-Q control system 20, or any portion thereof, such as the SRM-to-SM converter 140, may be embodied as hardware, software or any combination thereof. In addition, the D-Q control system 20 is configured to analyze the torque (T) as a product of the sinusoidal inductance related term and a current dependent term. The sinusoidal inductance related terms are obtained by correction terms, such that they become similar in appearance to a sine wave. Thus, by commanding the current related terms as sinusoidal components, the torque (T) produced by the switched reluctance motor (SRM) 10 is able to be smooth, without ripple, such as in a synchronous motor (SM).

Figure 2:
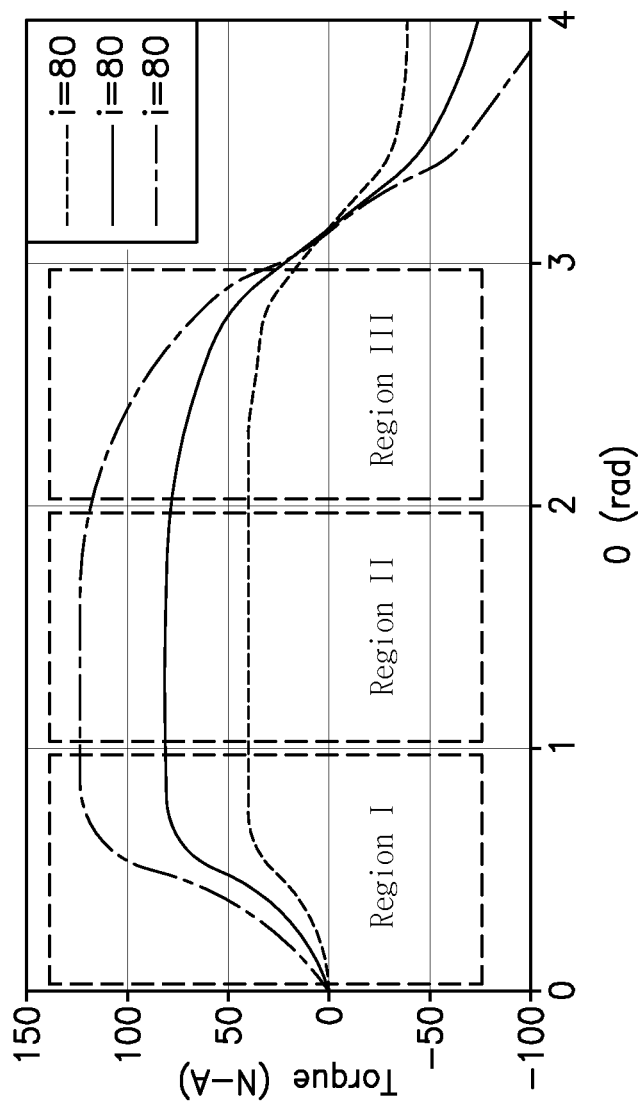
FIG. 2 is a chart showing the relationship between torque, electrical current, and rotor position of the SRM using the D-Q control system in accordance with the concepts of the present invention.

In particular, the D-Q control system 20 is configured for use with multi-phase switched reluctance motor (SRM), such as the three-phase SRM 10, whereby the torque (T) of the SRM is given by the equation:

$$T = f_{ia}f_{\theta a}(\theta) + f_{ib}f_{\theta b}(\theta) + f_{ic}f_{\theta c}(\theta) \quad (1),$$

where $f_{ix}$ is a function of the electrical current (i) drawn by the SRM 10, and $f_{\theta x}$ is a non-linear function of the angular rotor position ($\theta$) of the SRM 10, whereby x=a, b or c. The T-i-$\theta$ (i.e. torque, current and angular rotor position) characteristics of the SRM 10 are shown in FIG. 2, where a torque curve is shown as a distorted sine wave that depends on $f_{\theta x}$, while the amplitude of the torque curve for different currents depends on the electrical current (i). In particular, $f_{\theta x}$ is not a pure sine wave, and $f_{ix}$ is always greater than zero. By representing the functions $f_{ix}$ and $f_{\theta x}$ as sinusoidal terms, the D-Q control system 20 can be applied to control the SRM 10. Thus, as shown in FIG. 2, the torque (T) of the SRM 10 controlled by the D-Q control system 20 is shared in Regions I and III using smooth sinusoidal functions, thus preventing torque dips or ripple. In addition, most of the distortion in $f_{\theta x}$ occurs around the angular rotor positions $\theta=0$ and $\theta=\pi$; the D-Q control system 20 commands electrical current (i) to be close to zero around these regions, thus reducing the amount of distortion in $f_{\theta x}$. Finally, in region III, the commanded electrical current (i) decays smoothly, which suits the demagnetization region characteristics.

Returning to FIG. 1, torque controller command signals $f_q$ are sent from the torque controller 100 to the D-Q-to-ABC converter module 110, and are distributed among the three phases (A,B,C) of the SRM 10 through the components $f_{ix}$ that are in phase with $f_{\theta x}$. Phase advancing, which is performed by the phase-advancing module 180 is achieved by the term $f_d$ that is delivered to the D-Q-to-ABC module 110, as needed above the base speed. As such, the components $f_q$ and $f_d$ are converted by the D-Q-to-ABC conversion module 110 into the ABC domain to produce negative variables $f'_{ia}$, $f'_{ib}$, and $f'_{ic}$. However, because these variables in the ABC domain have negative values, they cannot be implemented using the torque equation (1). Thus, the negativity removal module 120 is used to modify the $f'_{ia}$, $f'_{ib}$, and $f'_{ic}$ variables by distributing the torque portion of the negative values between the other phases of the SRM 10. The negativity removal module 120, thus produces the non-negative variables $f_{ia}$, $f_{ib}$, and $f_{ic}$ to produce the same required torque (T). As previously discussed, the term $f_{\theta x}$ in equation (1) is a distorted sine wave, but the commanded term $f_{ix}$ is produced assuming a pure cosine wave $f_{\theta x}$. The non-linear model module 130 then makes the adjustments in $f_{ix}$ to compensate for the distortion in $f_{\theta x}$ and to generate the current commands.

Negativity Removal

Specifically, with regard to the negativity removal module 120, the variable $f'_{ix}$ is generated as a sinusoidal function, assuming sinusoidal $f_{\theta x}$. However, the actual value $f_{ix}$ should be non-negative, and then the negative values of $f'_{ix}$ should be redistributed between the other phases of the SRM 10 that have a positive current command. At a single instant, either one or two phases of the SRM 10 will produce negative torque, as the torque profiles of each phase are 120 degrees apart for a three-phase SRM 10. The reference frame of the controller 20 is aligned with the positive portion of the torque (T), given that the torque is a cosine function, which produces positive torque when the cosine function is positive. The sharing of the torque portion of the negative values of $f'_{ia}$, $f'_{ib}$, and $f'_{ic}$ between the other phases can be explained by the following example, where $f'_{ia}$ and $f'_{ib}$ are negative at a certain instant, such that the portion of the torque (T) taken or shared by $f_{ic}$ is given by:

$$f_{ic} = f'_{ic} + \frac{f'_{ia}\cos\theta}{\cos\left(\theta + \frac{2\pi}{3}\right)} + \frac{f'_{ib}\cos\left(\theta - \frac{2\pi}{3}\right)}{\cos\left(\theta + \frac{2\pi}{3}\right)}. \quad (2)$$

If only f'$i_a$ is negative, then $$f_{ic} = f'i_c + \frac{f'i_c\cos\left(\theta + \frac{2\pi}{3}\right) * f'i_a\cos\theta}{f'i_c\cos\left(\theta + \frac{2\pi}{3}\right) + f'i_b\cos\left(\theta - \frac{2\pi}{3}\right) * \cos\left(\theta + \frac{2\pi}{3}\right)}. \quad (3)$$

These equations (2) and (3) ensure that the required smooth torque is implemented using only positive values at f (x) and are the primary equations, which can be simplified to remove all divisions, making it easy to implement in hardware. After the negativity cancellation by the negativity removal module 120, the new values of the signals output by the negativity removal module 120 are $f_{ix}$. Furthermore, it is these values of $f_{ix}$ that maintain the torque sharing smoothness of the SRM 10 previously discussed.

Non-Linear Model Module

Figure 3:
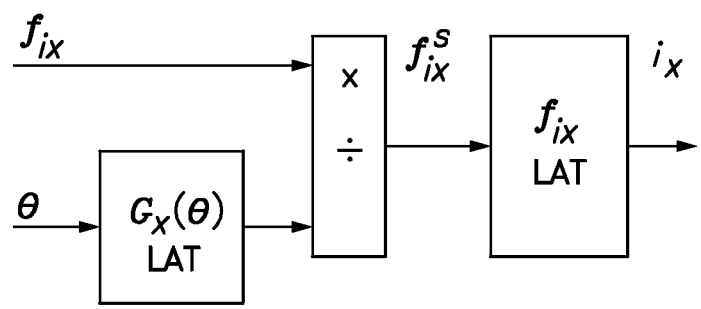
FIG. 3 is a block diagram of a non-linear model module provided by the D-Q control system in accordance with the concepts of the present invention.

The non-linear model module 130 of the controller 20 brings most of the complications in conventional SRM control systems. However, the D-Q SRM control system 20 uses very simple operational configuration for this block. The components of this block are shown in FIG. 3. For phase A of the SRM 10, the term $f_{\theta a}(\theta)$ in Equation (1) is a distorted sine wave, whereby $f_{\theta a}(\theta)$ can be represented by:

$$f_{\theta a}(\theta) = G_a(\theta)\cos\theta \to G_a(\theta) = \frac{f_{\theta a}(\theta)}{\cos\theta}. \quad (4)$$

The commanded term $f_{ia}$ is produced by the D-Q controller 20 assuming a pure sinusoidal $f_{\theta a}(\theta)$, and since this is not the case, a correction is needed to be made in the term $f_{ia}$ using $G_a(\theta)$. Assume now the current related function $f_{ia}$ is updated to be $f_{ia}^s$ given by $$f_{ia}^s = \frac{f_{ia}}{G_a(\theta)}.$$

By commanding $f_{ia}^s$ for torque production in Eq. (1), the torque $T_a$ of phase A becomes:

$$T_a = f_{ia}^s f_{\theta a}(\theta) = \frac{f_{ia}}{G_a(\theta)} G_a(\theta)\cos\theta = f_{ia}\cos\theta. \quad (5)$$

Equation (5) is the expression used to achieve smooth torque sharing. A similar process is also performed with regard to the other phases B and C of the SRM 10, but has not been shown for the sake of brevity. In addition, the function $G_a(\theta)$ can be represented in a look-up table, stored at the controller system 20, to make the controller 20 less complex. Because $f_{ia}^s$ does not depend on the angular rotor position θ of the SRM 10, one point per curve (the peak value) can be used to make another look-up table stored at the controller system 20, that relates the function $f_{ix}^s$ with the corresponding current value to simplify the D-Q controller 20.

Phase Advancing Block

Figure 4:
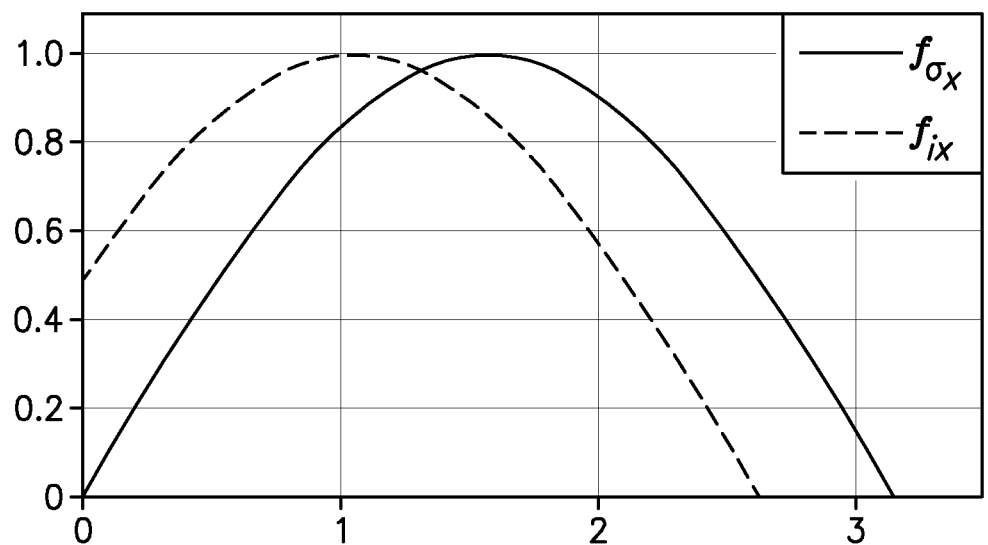
FIG. 4 is a chart showing the advancing of the waveform $f_{ix}$ in accordance with the concepts of the present invention.

In a synchronous motor or machine (SM), flux weakening for high-speed operation of the SM motor is achieved by commanding a current in the d-axis. The D-Q SRM control 20 of the present invention is able to provide similar operating effect, by commanding $f_d$ in the d-axis. For example, where $f_q$ and $f_d$ in FIG. 1 are non-zero, the waveform of $f_{ix}$ will be advanced from $f_{\theta x}$, as shown in FIG. 4. The advanced $f_{ix}$ faces the lower back EMF (electromagnetic frequency) voltage and the electrical current is able to grow faster. The negativity removal module 120 corrects the production of the negative torque at the beginning. As such, the control system 10 of the present invention essentially advances the conduction angle to prevent negative torque at the end of the command, and commands higher currents at the beginning when there is lower back EMF. This assists in achieving higher torque (T) at higher speeds, while minimizing torque ripple as much as possible.

In addition, an adaptive method is provided by the D-Q controller 20 to determine the amount of phase advance needed. This method utilizes two preset values in the controller 20. The first one is a threshold position, which is the point where the maximum rate of change of torque (T) takes place. The D-Q controller 20 analyzes the first occurrence of this maximum rate of change in the negative torque production region, as it was found that for maximum torque per ampere some amount of negative torque is produced. In order to determine the amount of phase advance that produces the maximum torque (T) per ampere, the second threshold position is used, which is a preset current value, which can be:

$$I_{th} = k * \omega * \frac{Icmd}{VDC}, \quad (6)$$

where k is determined through experimental curve fitting.

Figure 5:
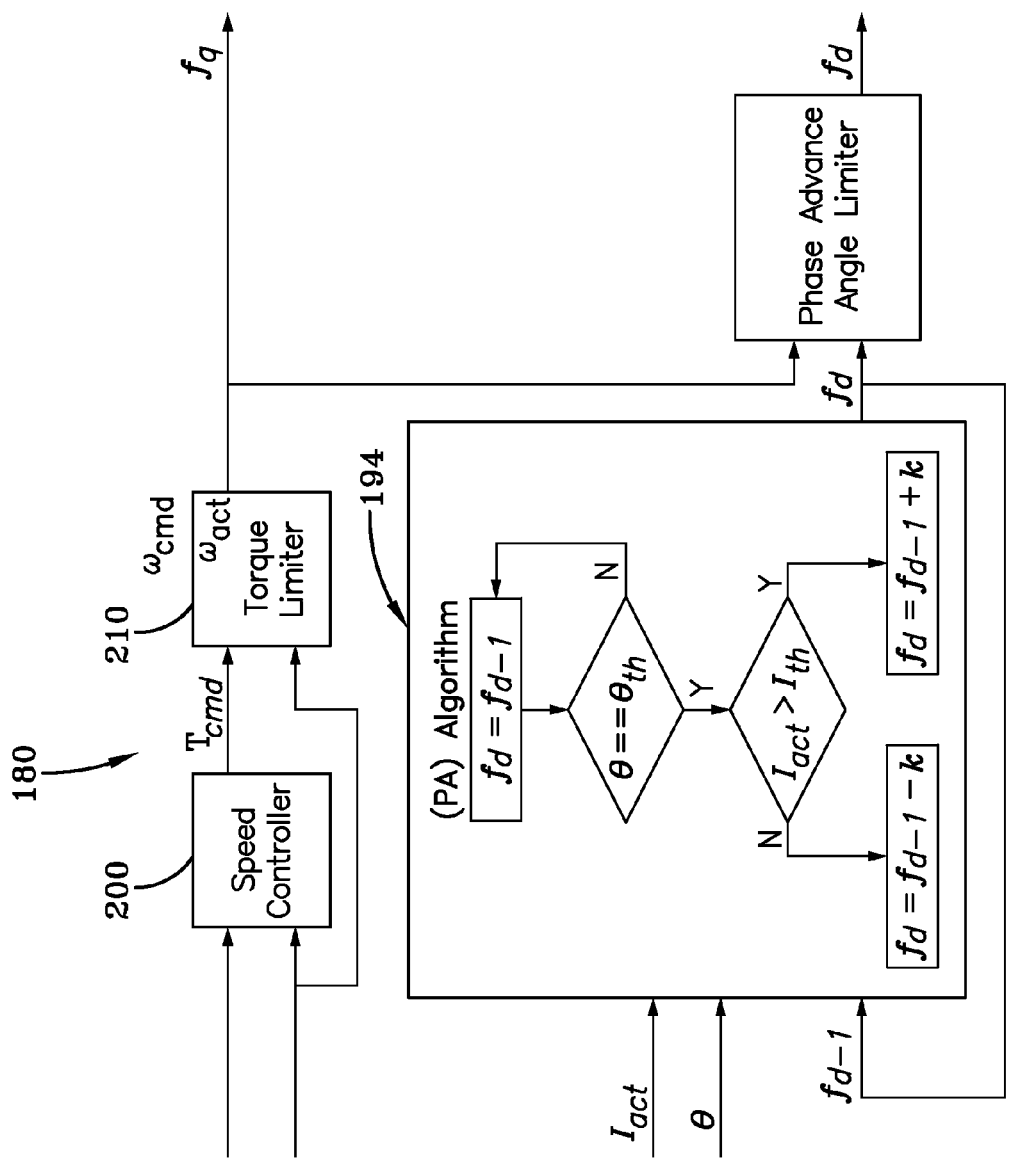
FIG. 5 is a block diagram showing the phase-advancing (PA) algorithm used by the phase-advancing module of the D-Q control system in accordance with the concepts of the present invention.

The block diagram showing the sequence of steps performed by an adaptive phase advancing control/algorithm 194 of the phase control module 180 is shown in FIG. 5. The command for $f_q$ can be determined from either a speed controller 200 or a torque limiter 210, and the phase-advancing module 180 determines the amount of $f_d$ iteratively. When the rotor position of the SRM 10 reaches the position of $\theta_{th}$, the phase advancing algorithm 194 of module 180 brings the actual current to Ith iteratively. Specifically, the phase advancing (PA) algorithm 194 provides that $f_d$ is updated only when the angular rotor position (θ) crosses the threshold position $\theta_{th}$. In the next step, the actual phase current $I_{act}$ is compared with the threshold current $I_{th}$. If the actual current $I_{act}$ is greater than the threshold current $I_{th}$, $f_d$ is reduced by an amount equal to k. Here, k determines the resolution of the advancing. The smaller the value of k is, the higher the resolution. If the actual current $I_{act}$ is less than the threshold current $I_{th}$, $f_d$ is incremented by an amount equal to k. Thus, the PA algorithm 194 facilitates bringing the $I_{act}$ to $I_{th}$ iteratively at that threshold position $\theta_{th}$. The adaptive PA algorithm 194 also has a limiter incorporated into it, which ensures that the system does not go out of bounds.

Thus, the phase-advancing control system of the present invention is able to adapt itself to adjust the amount of phase advancing, irrespective of the operating conditions of the SRM 10. The benefits of this system when used in conjunction with the D-Q control method is to allow high speed operation of the SRM 10 through adaptive phase advancing, while preserving the torque ripple minimization feature that is inherent in synchronous motor (SM) control systems.

Based on the foregoing, the advantages of the present invention are readily apparent. One advantage of the present invention is that a D-Q control system for a switched reluctance motor (SRM) is similar to an SM controller in the DQ rotating reference frame by transforming the torque component into the DQ frame instead of the inductance or flux. Another advantage of the present invention is that a D-Q control system for an SRM has a simple structure and removes the need for angle decoding blocks from the SRM control structure. Still another advantage of the present invention is that a D-Q control system for an SRM uses approximate lookup tables for torque control, while providing low torque ripple. Yet another advantage of the present invention is that a D-Q control system for an SRM provides the necessary phase advancing to operate the SRM at high speeds. Another advantage of the present invention is that the a D-Q control system for an SRM is efficient, removes the need for an angle decoder, which inherently reduces torque ripple of the SRM, while being able to drive the SRM over its entire, wide, speed range. An additional advantage of the present invention is that a D-Q control system is able to achieve low torque ripple at low speeds, and is able to apply phase advancing using a mechanism similar to flux weakening used by synchronous motors (SM) to operate the SRM at high speeds.

Thus, it can be seen that the objects of the present invention have been satisfied by the structure and its method for use presented above. While in accordance with the Patent Statutes, only the best mode and preferred embodiment has been presented and described in detail, it is to be understood that the present invention is not limited thereto or thereby. Accordingly, for an appreciation of the true scope and breadth of the invention, reference should be made to the following claims.

What is claimed is:

1. A converter module for a D-Q control system to control a switched reluctance motor (SRM) by a torque command signal and a phase advancing signal in a D-Q domain, wherein the torque command signal and the phase advancing signal are each converted into a plurality of 3-phase control signals by a D-Q to ABC converter module, such that at least one signal component of one or more of said 3-phase control signals has a negative torque value, the converter module comprising:

a negativity removal module to process the plurality of control signals, so as to distribute the negative torque value to one or more other control signals that do not have a negative torque value; and a non-linear module adapted to be coupled to the SRM, wherein said non-linear module removes distortion from each one of said control signals that has been processed by said negativity removal module, which are applied to the SRM to control the torque output therefrom; and a phase advancing module coupled to the DQ-to-ABC converter module, said phase advancing module configured to receive speed data of a rotating rotor of the SRM, such that said phase advancing module advances the phase advancing signal by an amount, wherein said amount of phase advancement is based on a comparison of an actual current being applied to the SRM to a threshold current value, so as to control the SRM, when the rotor of the SRM has moved to a predetermined position.

2. The converter module of claim 1, wherein said negativity removal module is coupled to the SRM to receive angular position data of a rotating rotor of the SRM therefrom.

3. The converter module of claim 1, wherein said non-linear model module is coupled to the SRM to receive speed data of a rotating rotor of the SRM therefrom.

4. The converter module of claim 1, wherein said D-Q to ABC module is coupled to the SRM to receive angular position data of a rotating rotor of the SRM therefrom.

* * * * *